(12) United States Patent
Sakura

(10) Patent No.: US 7,408,662 B2
(45) Date of Patent: Aug. 5, 2008

(54) PRINT SYSTEM AND METHOD OF CONTROLLING ITS USER INTERFACE

(75) Inventor: Masayuki Sakura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1023 days.

(21) Appl. No.: 10/350,049

(22) Filed: Jan. 24, 2003

(65) Prior Publication Data

US 2003/0142351 A1    Jul. 31, 2003

(30) Foreign Application Priority Data

Jan. 25, 2002    (JP)    .............................. 2002-017219

(51) Int. Cl.
*G06F 15/00*    (2006.01)
*G06F 9/44*    (2006.01)
(52) U.S. Cl. ..................... 358/1.15; 717/168
(58) Field of Classification Search ............... 358/1.15, 358/1.16, 1.13, 1.17; 709/223, 224, 217, 709/219, 221, 228; 715/262, 265, 269; 710/6, 710/8, 18, 72; 717/168
See application file for complete search history.

(56) References Cited

U.S. PATENT DOCUMENTS

| | | | |
|---|---|---|---|
| 5,832,298 A | 11/1998 | Sanchez et al. ............. | 395/828 |
| 6,694,376 B1* | 2/2004 | Ohara ......................... | 709/250 |
| 2001/0027517 A1 | 10/2001 | Kato .............................. | 713/1 |
| 2002/0022990 A1* | 2/2002 | Kurata et al. .................. | 705/14 |

FOREIGN PATENT DOCUMENTS

| | | |
|---|---|---|
| CN | 1269894 A | 10/2000 |
| JP | 2-188822 | 7/1990 |
| JP | 2000-066848 | 3/2000 |
| JP | 2000-353079 | 12/2000 |
| JP | 2001-047707 | 2/2001 |
| WO | 99/09470 | 2/1999 |

OTHER PUBLICATIONS

Office Action in corresponding CN 031007716.

* cited by examiner

*Primary Examiner*—Saeid Ebrahimi Dehkordy
(74) *Attorney, Agent, or Firm*—Fitzpatrick, Cella, Harper & Scinto

(57) ABSTRACT

This disclosure relates to a technique for eliminating adverse influences when a mismatch between the firmware version of a printer and the driver version has occurred. A printer driver acquires the ID and version information of firmware from a printer. If acquisition is successful, the printer driver searches a firmware management table on the basis of the acquired firmware related information so as to check if the firmware is compatible to a new function. If the firmware is compatible to the new function, the printer driver provides a user interface that allows a setup associated with the new function; otherwise, it masks a setting control of the new function.

18 Claims, 14 Drawing Sheets

FIG. 3

FIRMWARE ID = 0x1234567890ABCDEF1234567890ABCDEF; ~301

FIRMWARE VERSION = 0x0100; ~302

FIG. 4

FIRMWARE ID : 1234567890ABCDEF1234567890ABCDEF ~401

FIRMWARE VERSION : 1.0 ~402

| FIRMWARE ID | VERSION | FRONT/BACK COVER FUNCTION | ... |
|---|---|---|---|
| 0x1234567890ABCDEF 1234567890ABCDEF | 0x200 | PRESENT | ... |
| 0x1234567890ABCDEF 1234567890ABCDEF | 0x100 | ABSENT | ... |
| ... | ... | ... | ... |

FIG. 14

```
                    ┌─────────────────┐
                    │  STATUS PRINT   │
                    └─────────────────┘

HARDWARE INFORMATION
      PRODUCT NAME : 3300
      RAM SIZE : 192MB
      HDD SIZE : 5GB
      OPTION DEVICE :  SADDLE FINISHER
                      SIDE PAPER DECK

FARMWEAR ID : 12345679ABCDEF 12345679ABCDEF  ～ S1402
      FARMWEAR VERSION : 2.0 ～ S1403

PRINTER COMMON SETUP
      NUMBER OF COPIES :  1
      DOUBLE-SIDED : SINGLE-SIDED
      SORTER : NOT USED
      BOOKBINDING PRINT : NOT USED
      TONER DENSITY : 5
```

S1401

PRINT SYSTEM AND METHOD OF CONTROLLING ITS USER INTERFACE

FIELD OF THE INVENTION

This invention relates to a method of providing a user interface which is used to control devices connected to an information processing apparatus and, more particularly, to a method of providing a user interface in correspondence with a difference in updateable firmware installed in each device.

BACKGROUND OF THE INVENTION

Some conventional printers can update their firmware. When firmware is updated, for example, a new function is added to a printer. However, such new function cannot often be used only when firmware is updated. Normally, since the functions on the printer side are controlled by a printer driver which runs on the computer side, the new function cannot be used unless the printer driver is updated. Hence, the latest firmware requires the latest driver, and vice versa.

Even when the firmware of a printer is old, the latest printer driver can be installed in the computer in practice. That is, the printer driver is often incompatible to the firmware. In such case, when a setup dialog of the printer driver is launched, a user interface is provided as if a new function which is not supported by the old firmware could be set.

Therefore, the user must recognize functions which are currently supported, and must take precaution so that he or she may not change setups of unsupported functions.

If a new function which is not supported by the old firmware is set using the latest printer driver, the printer with the old firmware receives an unknown command, and may malfunction.

Furthermore, it is difficult to recognize functions implemented by firmware even when the user observes the outer appearance of a printer. For this reason, the user cannot easily recognize if a specific function is supported.

SUMMARY OF THE INVENTION

Accordingly, it is an object of the present invention to reduce adverse influences when a mismatch between the firmware version and driver version has occurred.

According to the present invention, the foregoing object is attained by providing a print system which includes a printer (device to be controlled) connected to a communication medium, and an information processing apparatus (controller) connected to the printer via the communication medium, the printer comprising: a first storage component for storing updateable firmware; a second storage component for storing identification information of the firmware; and an output component for outputting the identification information, and the information processing apparatus comprising: an input component for inputting the identification information; and a display control component for controlling to display a user interface which corresponds to the input identification information, and is used to set a plurality of functions included in the printer.

With this arrangement, the current firmware installed in the printer can be specified, and a more suitable user interface can be provided to the user. As a result, the user need neither recognize supported functions, nor take precautions so that the user may not change unsupported functions. For example, a user interface used to set a new function is provided to firmware added with the new function, while a user interface that does not include any control for setting the new function is provided to old firmware. In this manner, the unsupported functions are less likely to be changed, and malfunctions of a printer with old firmware can be reduced.

The information processing apparatus may further include a transmission component for transmitting an output instruction that makes the output component output the identification information, and the output component may output the identification information in response to the output instruction. That is, since the information processing apparatus can instruct the printer to output information associated with firmware, user's convenience can improve.

The output component may comprise one of an image forming component for forming an image of the identification information, a communication interface for transmitting the identification information to the information processing apparatus, a display component for displaying the identification information, and an audio output component for audibly outputting the identification information. That is, when the image forming component prints the identification information on a medium such as a paper sheet or the like, the user can easily recognize the identification information. When the identification information is sent from the printer, the user can easily recognize the identification information without taking the trouble of attending the printer. When the display component such as a liquid crystal display displays the identification information, paper sheets, toner, and the like can be saved. When the identification information is output from an audio output device such as a loudspeaker or the like, paper sheets, toner, and the like can be similarly saved.

The input component may comprise an input device for inputting the identification information, or a communication interface for receiving the identification information. For example, when the identification information is input from a mouse, keyboard, speech recognition device, or the like, the printer driver can recognize the version information and the like of the firmware. When the communication interface can receive the identification information via a network, the need for manual inputs can be obviated.

The identification information may contain at least one of ID information and version information of the firmware. That is, the identification information suffices as information with which the presence/absence of a predetermined function is recognized, and information different from those exemplified above may be adopted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of the internal data formats of the firmware ID and firmware version in a printer and printer driver;

FIG. 4 shows an example of the expression forms of the firmware ID and firmware version for the user;

FIG. 14 shows a print example of hardware information.

DETAILED DESCRIPTION OF THE PREFERRED EMBODIMENTS

Preferred embodiments of the present invention will now be described in detail in accordance with the accompanying drawings.

A printer will be exemplified hereinafter as an example of a device to be controlled. However, the present invention can be applied to any other types of control devices and devices to be controlled, as long as the device to be controlled comprises updateable firmware, and the control device comprises an updateable control driver used to control the device to be controlled. The device to be controlled includes, for example, a printer, scanner, digital still camera, digital video camera, and other computer peripheral devices. The control device includes, for example, a personal computer, PDA (Personal Digital Assistant), digital camera which can be directly connected to a printer, and the like. These are merely examples, and the present invention is not limited to these specific devices.

Figure 1:
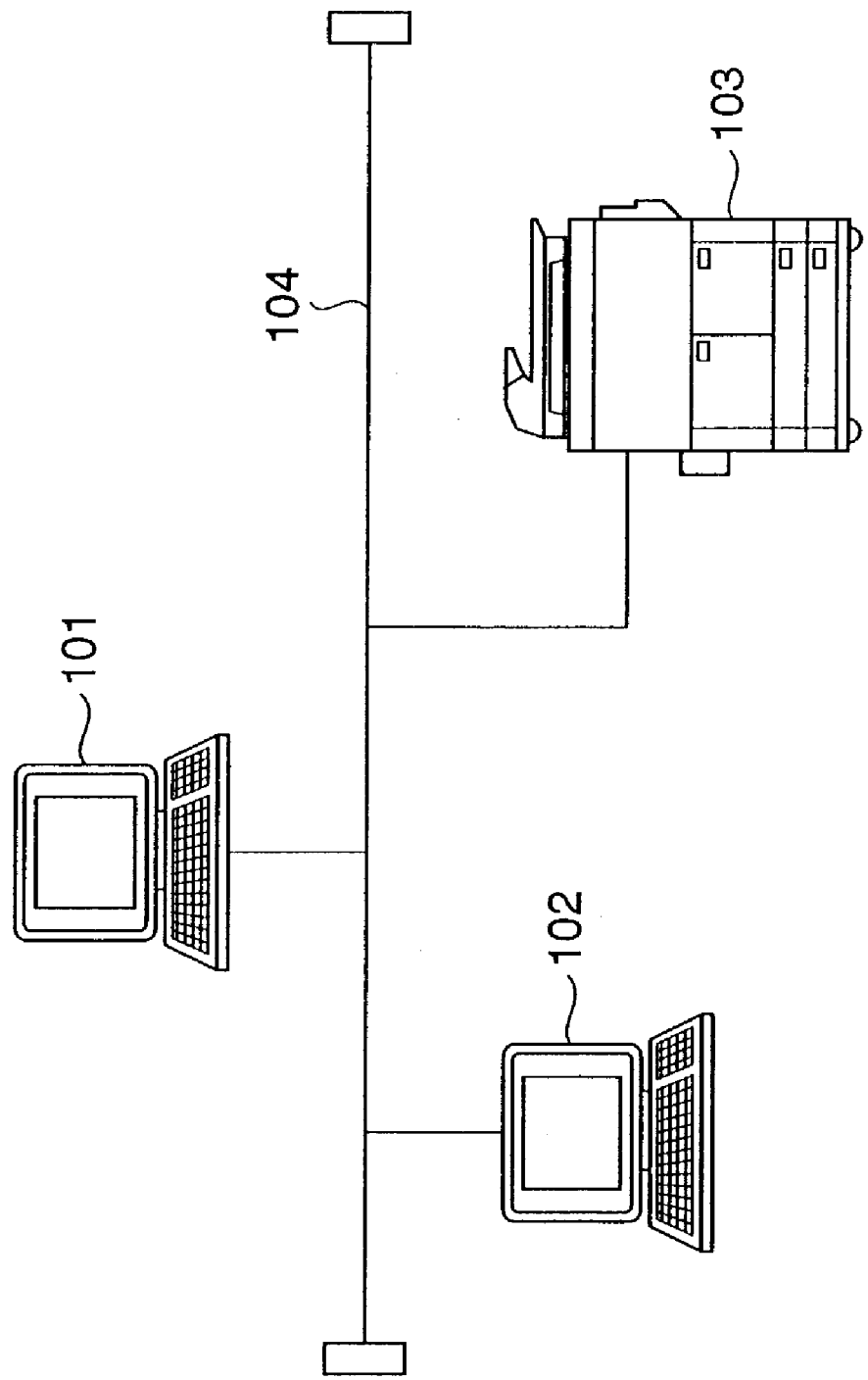
FIG. 1 is a schematic diagram showing an example of a print system according to an embodiment of the present invention.

FIG. 1 shows an example of a print system according to this embodiment. Client computers 101 and 102 are connected to a network printer 103 via a computer network 104. A printer driver for controlling the network printer 103 is installed in each of the client computers 101 and 102. Updateable firmware is installed in the network printer 103, and can be updated by transferring new firmware from the client computer 101 or 102.

Figure 2:
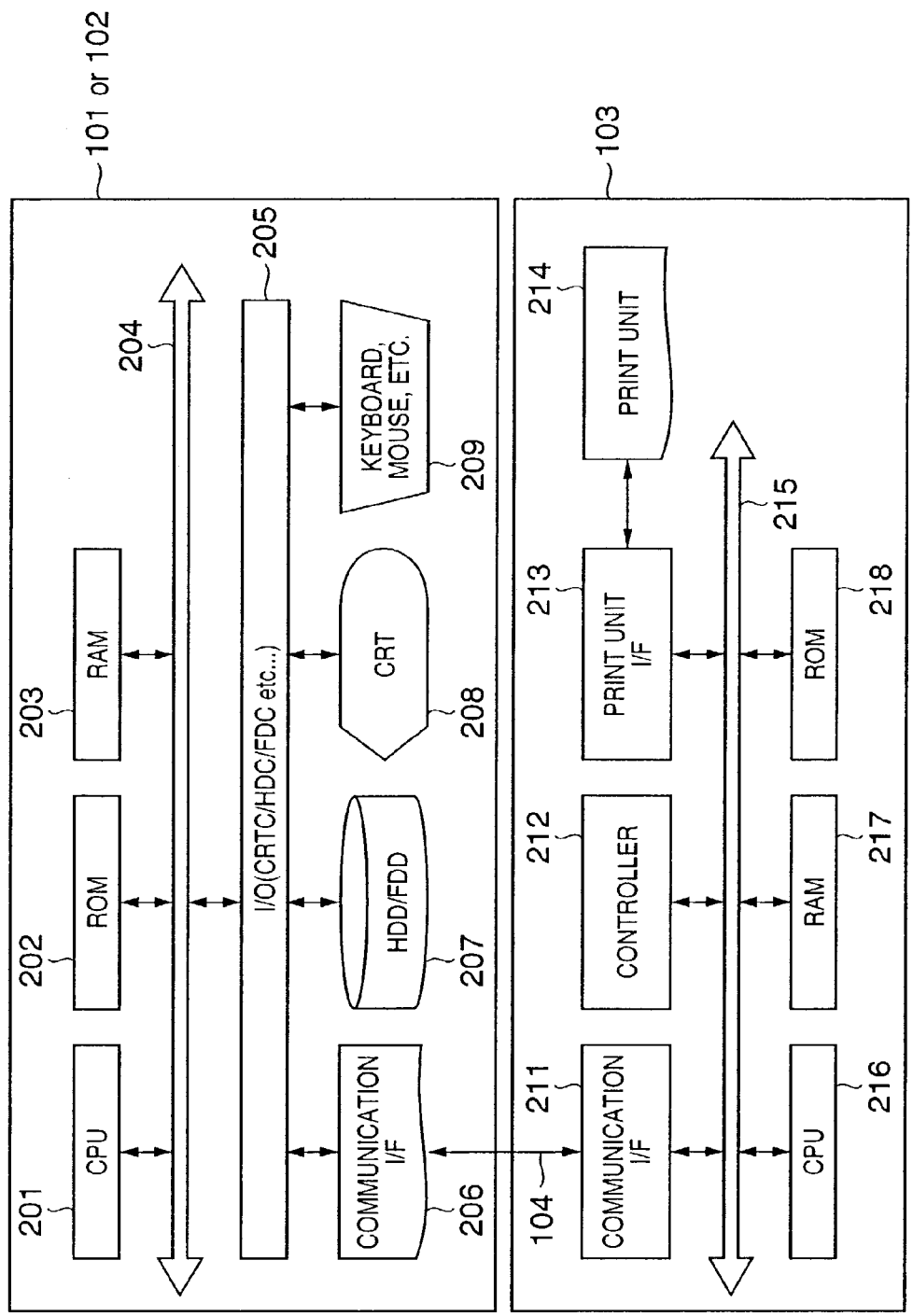
FIG. 2 is a block diagram showing an example of the arrangement of a client computer 101 or 102 and network printer 103.

FIG. 2 is a block diagram showing an example of the arrangement of the client computer 101 or 102 and network computer 103. The client computer 101 or 102 comprises a CPU 201, ROM 202, RAM 203, system bus 204, I/O controller (CRTC (CRT controller/HDC (hard disk drive controller)/FDC (flexible disk drive controller)/etc . . . ) 205, communication interface (I/F) 206, hard disk drive (HDD)/flexible disk drive (FDD) 207, CRT 208, keyboard/mouse 209, and the like. The CPU 201 operates on the basis of an application program, printer driver, OS, and the like, which are loaded from the HDD/FDD 207 and the like onto the RAM 203. The CPU 201 starts in accordance with a boot program stored in the ROM 202 upon power ON, loads the OS from the HDD/FDD 207 onto the RAM 203, and also loads an application program onto the RAM 203, thus implementing functions of an image forming system. The communication I/F 206 sequentially sends print data spooled in the RAM 203 or HDD 207 to the network printer 103. Also, the communication I/F 206 transfers new firmware, and sends inquiry information of firmware identification information (ID, version information, and the like), instruction information which instructs to print the identification information, and the like. The communication I/F 206 receives the identification information sent from the network printer 103. The keyboard/mouse 209 is used to fetch user's instruction data into the client computer via the I/O 205. The CRT 208 is a display device, and is controlled by the CRTC in the I/O 205. A user interface is formed by these blocks, i.e., the CRT 208 and keyboard/mouse 209.

On the other hand, the network printer 103 comprises a communication I/F 211 which receives print data, firmware, inquiry information, instruction information, and the like from the client computer 101 or 102, and sends information associated with firmware to the client computer 101 or 102, a controller 212 which mainly interprets received print data, and generates data to be printed by a print unit, and a print unit 214 as a print engine, which receives data output from a print unit I/F 213, and actually forms an image. Also, the printer 103 comprises a CPU 216, ROM 218, and RAM 217. The CPU 216 executes processes on the basis of an inquiry and instruction received from the client computer 101 or 102. The ROM 218 stores firmware, its ID Information and version information, and the like. In order to allow to update firmware, the ROM 218 comprises an EEPROM or the like. The RAM 217 serves as a work area of the CPU 211. The printer 103 further comprises a control panel and the like (not shown).

With the above arrangement, there is provided a print system which includes a printer connected to a communication medium (e.g., computer network 104), and an information processing apparatus (e.g., client computer 101 or 102) connected to the printer (e.g., network printer 103) via the communication medium, characterized in that the printer comprises a first storage component (e.g., ROM 218, RAM 217) for storing updateable firmware, a second storage component (e.g., ROM 218, RAM 217) for storing identification information of the firmware, and an output component (e.g., print unit 214, communication I/F 212) for outputting the identification information, and the information processing apparatus comprises an input component (e.g., communication I/F 206, keyboard/mouse 209) for inputting the identification information, and a display control component (e.g., CPU 201) for displaying a user interface which corresponds to the input identification information and is used to set a plurality of functions included in the printer.

With this arrangement, the current firmware installed in the printer can be recognized, and a more suitable user interface can be provided to the user. As a result, the user need neither recognize supported functions, nor take precautions so that the user may not change unsupported functions. For example, a user interface used to set a new function is provided to firmware added with the new function, while a user interface that does not include any control for setting the new function is provided to old firmware. In this manner, the unsupported functions are less likely to be changed, and malfunctions of a printer with old firmware can be reduced.

FIG. 3 shows an example of the internal data formats of the firmware ID and firmware version in the printer and a printer driver. Reference numeral 301 denotes the internal format of the firmware ID; and 302, that of the firmware version. These pieces of information are used as firmware identification information.

FIG. 4 shows the expression forms of the firmware ID and firmware version for the user. Reference numeral 401 denotes the expression form of the firmware ID; and 402, that of the firmware version.

The firmware ID is unique, arbitrary 128-bit information. Also, the firmware version is 16-bit information: the upper 8 bits represent the major version, and the lower 8 bits represent the minor version. Although this embodiment adopts such definitions, any other data formats of the firmware ID and firmware version may be adopted as long as a difference in firmware can be identified, as will be understood by those who are skilled in the art. In the above description, the firmware ID assumes an appropriate 128-bit value, but it is merely an example. Therefore, UUID (Universal Unique ID: 128-bit numerical value which is guaranteed to be unique) may be used to avoid overlap with other printers upon implementation.

The firmware ID of the firmware installed in the network printer is expressed using a hexadecimal value:
0×1234567890ABCDEF1234567890ABCDEF Assume that old firmware without any "front/back cover insert" function is expressed by 0×0100, and new firmware with the "front/back cover insert" function is expressed by 0×0200. In this case, the internal expressions of the firmware ID and firmware version in the printer and printer driver are as shown in FIG. 3: the firmware ID 301 stores 0×1234567890ABCDEF1234567890ABCDEF, and the firmware version 302 stores 0×0100 or 0×0200.

These firmware ID and firmware version are also displayed on a printer information page output from the printer, and a function setup dialog of the printer driver. In this case, the firmware ID 401 is expressed by 1234567890ABCDEF1234567890ABCDEF, and the firmware version 402 is expressed by 1.0 or 2.0, as shown in FIG. 4. Note that there are two firmware versions 0×0100 and 0×0200, and a functional difference depending on the firmware version is the "front/back cover insert" function alone in this embodiment. However, the number of versions and the number of types of functions can be three or more, as will be understood by those who are skilled in the art.

In this embodiment, assume that the printer driver installed in each of the client computers 101 and 102 is compatible to the firmware version 0×0200, and supports the "front/back cover insert" function.

This printer driver must control the "front/back cover insert" function on a user interface on the basis of the firmware version of firmware installed in the network printer 103. Note that the "front/back cover insert" function is set on a paper feed sheet of a setup dialog of the printer driver.

Figure 5:
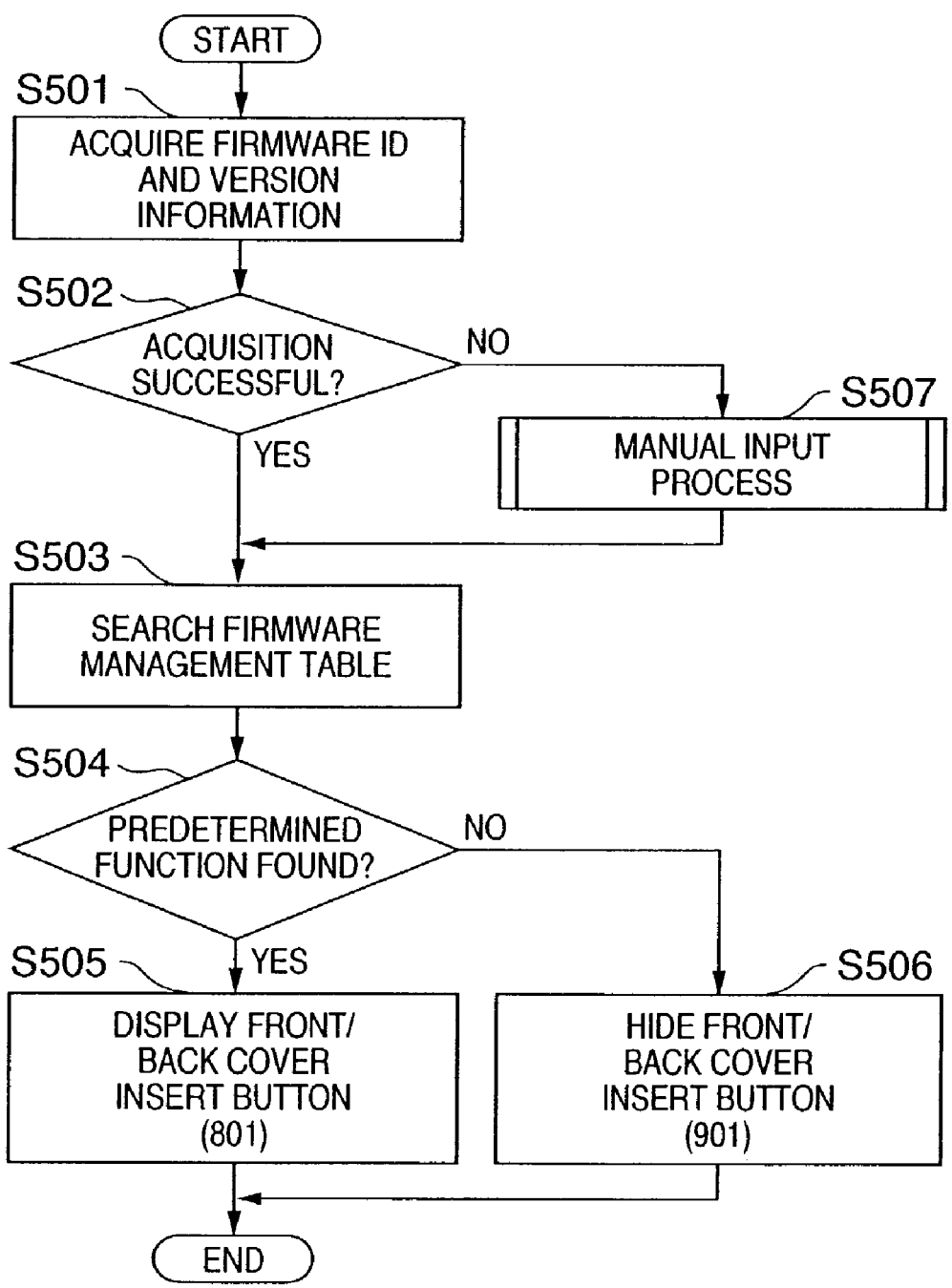
FIG. 5 is a flow chart showing an example of the process of the printer driver.

FIG. 5 is a flow chart showing the process of the printer driver according to this embodiment. More specifically, FIG. 5 is a flow chart associated with a process executed when the printer driver automatically acquires printer information of the network printer 103 via the network. For example, when the user has pressed a device information acquisition button on a device setup window of the printer driver, a program that pertains to the flow chart in FIG. 5 is executed. The printer information is acquired from the printer by pressing this device information acquisition button, and the functions of the printer that the printer driver can set are enabled/disabled in accordance with the acquired printer information, for the following reason. That is, since a printer driver immediately after installation has default setups compatible to an old model, and cannot use a new function although a new printer added with the new function is connected, information of the printer must be acquired to make setups compatible to the current model and version of the printer.

In step S501, the CPU 201 sends inquiry information used to inquire firmware related information to the network printer 103 via the communication interface 206, so as to acquire information associated with the firmware of the printer. Since a printer driver does not recognize the firmware version of the network printer 103, which is set as an output destination, immediately after it is installed in the computer 101, information associated with the firmware must be acquired. Since the firmware can be updated as needed, the printer driver must detect the current firmware version.

Figure 6:
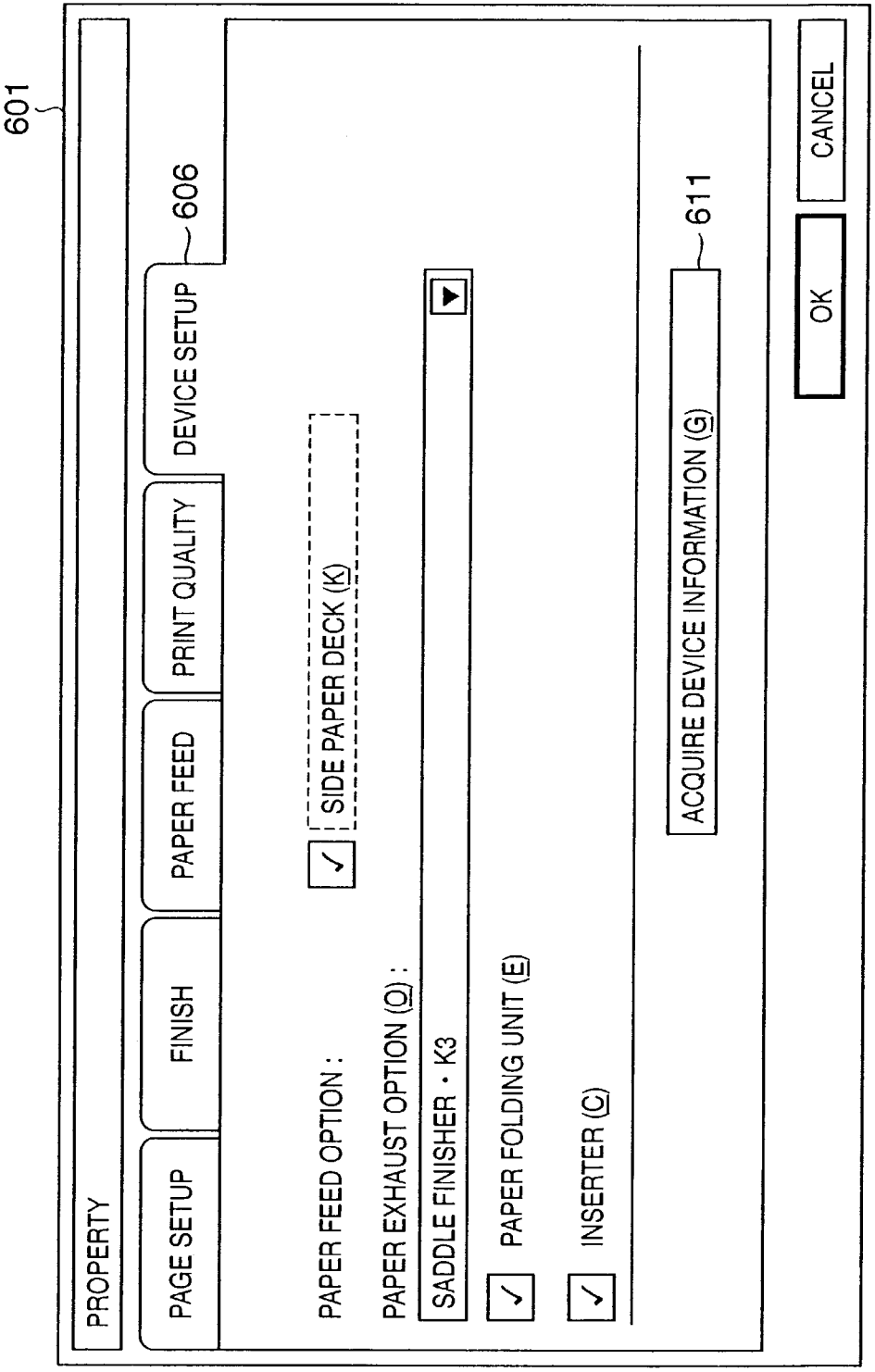
FIG. 6 shows an example of a dialog used to set device functions.

FIG. 6 shows an example of a dialog used to set device functions. The user executes automatic acquisition of printer information of the network printer so as to appropriately set the printer driver. As shown in FIG. 6, the user displays a device setup sheet 606 of a printer driver setup dialog 601, and presses a device information acquisition button 611. Upon depression of this button, the printer driver starts an acquisition process of printer information of the network printer 103. Note that firmware related information may contain device configuration information in addition to the firmware ID and firmware version.

Upon receiving inquiry information via the communication interface 211, the CPU 216 of the network printer 103 reads out the firmware ID and firmware version information from the ROM 218. Furthermore, the CPU 216 sends the firmware ID and firmware version information to the client computer via the communication interface 211.

In step S502, the CPU 201 monitors information received by the communication interface 206 to see if information associated with firmware is sent from the network printer 103. If the information associated with firmware can be acquired, the flow advances to step S503; otherwise, the flow advances to step S507.

Steps S503 and S504 are processes for specifying printer functions, and selecting an appropriate user interface. Or these steps are processes for checking if predetermined functions are included, and displaying a user interface that includes setup controls corresponding to the functions included in the printer on the basis of the checking result.

Figure 7:
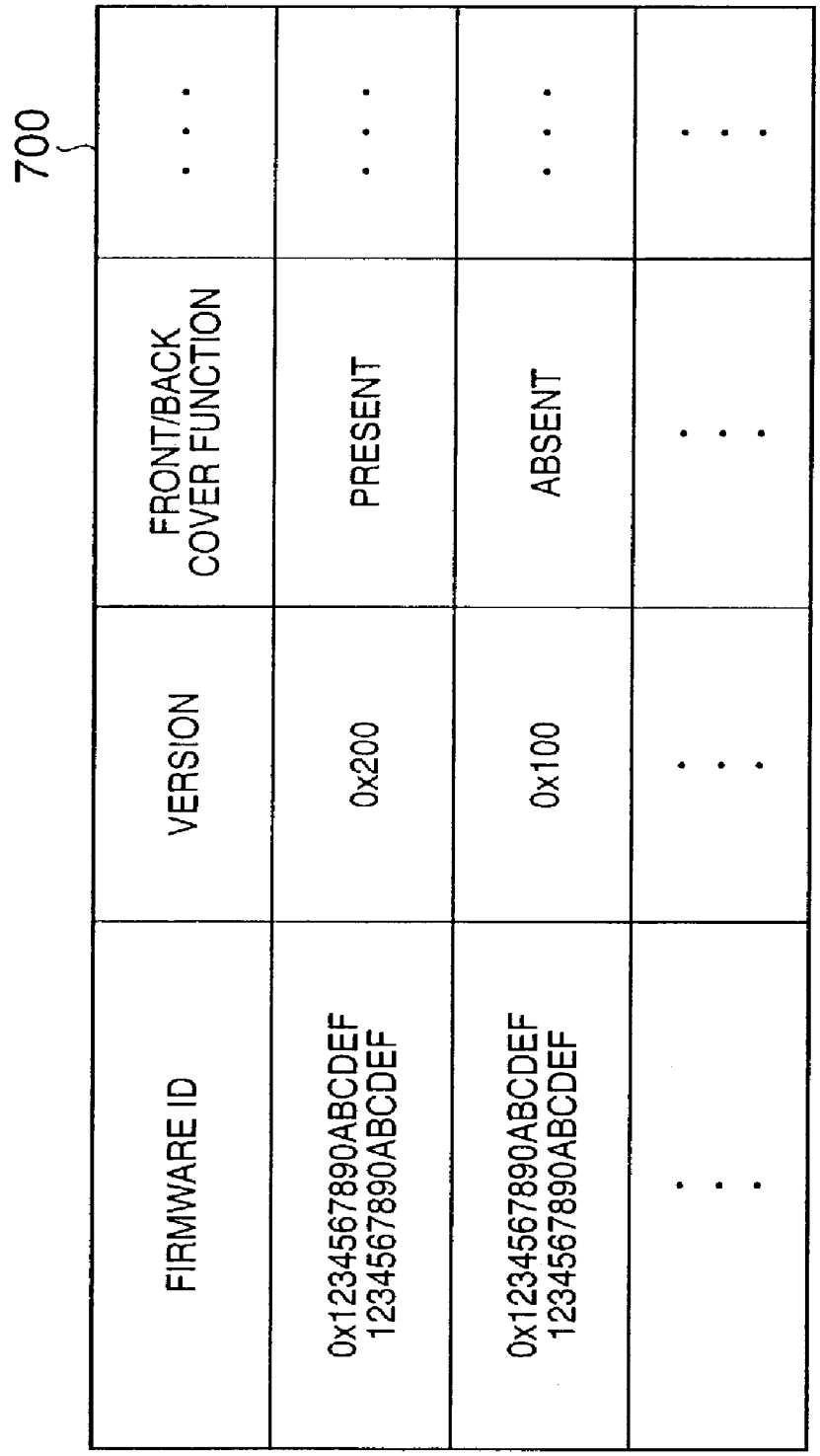
FIG. 7 shows an example of a firmware management table.

In step S503, the CPU 201 saves the acquired firmware ID and firmware version inside the printer driver. Furthermore, the CPU 201 searches a firmware management table 700 shown in FIG. 7 for version information and presence/absence information of functions corresponding to the acquired ID, and extracts them. Assume that the firmware management table 700 is stored in an arbitrary storage device such as the HDD 207 or the like. The CPU 201 reflects the acquired device configuration information in a user interface. Note that a user interface ID used to specify a user interface may be registered in the firmware management table 700. That is, a corresponding user interface can be selected based on the user interface ID.

In step S504, the CPU 201 extracts the firmware version information from the received firmware related information, and compares the version information read out from the firmware management table to check the presence/absence of the "front/back cover insert" function. If it is determined that the "front/back cover insert" function is present (firmware version=0×0200), the flow advances to step S505; otherwise (firmware version=0×0100), the flow advances to step S506.

Figure 8:
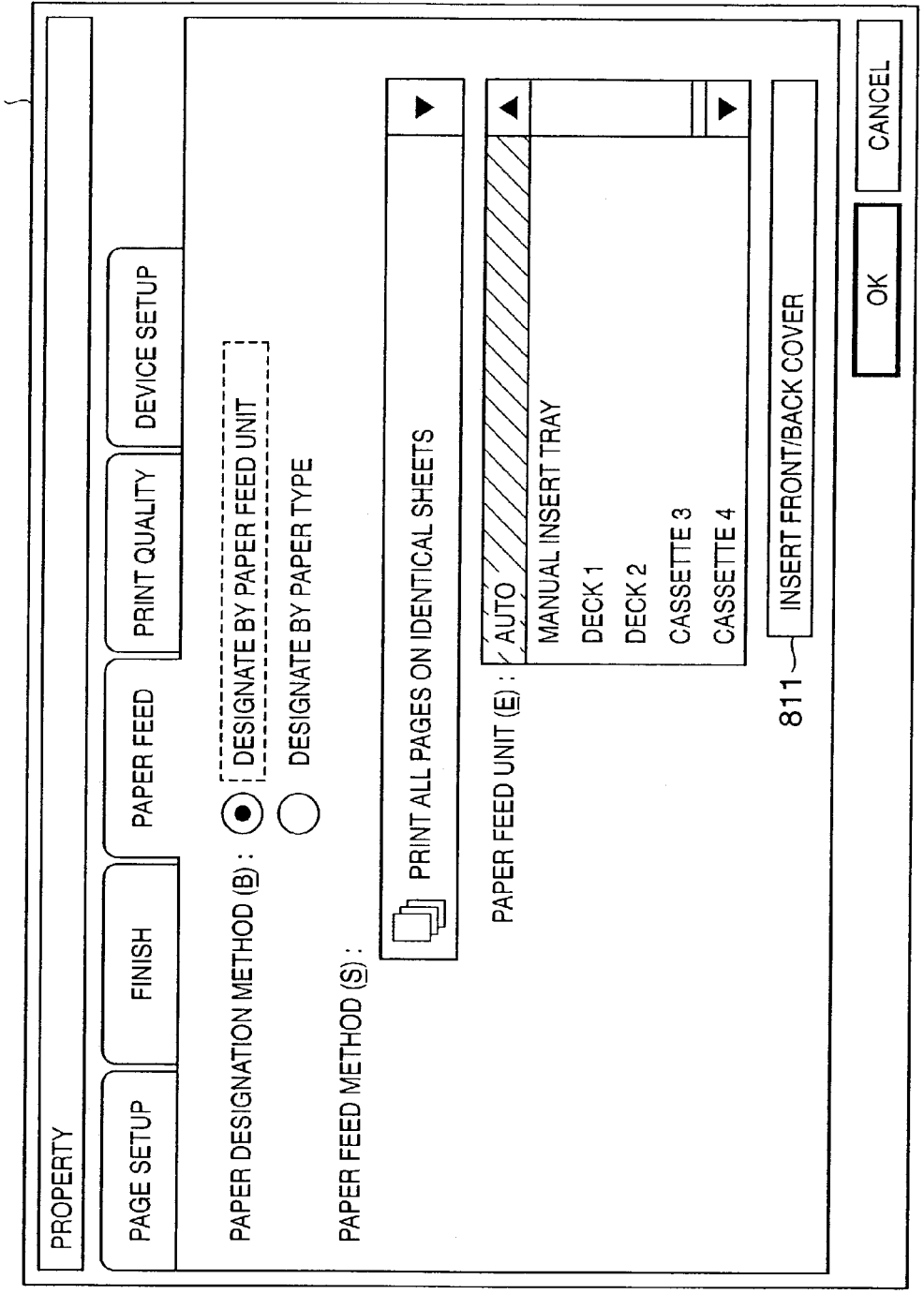
FIG. 8 shows an example of a user interface when firmware is new.

In step S505, the CPU 201 displays a dialog 801 used when it is determined that the "front/back cover insert" function is present on the CRT 208, as shown in FIG. 8. Especially, a control 811 which allows the user to set the "front/back cover insert" function is displayed, and the user can set the "front/back cover insert" function.

Figure 9:
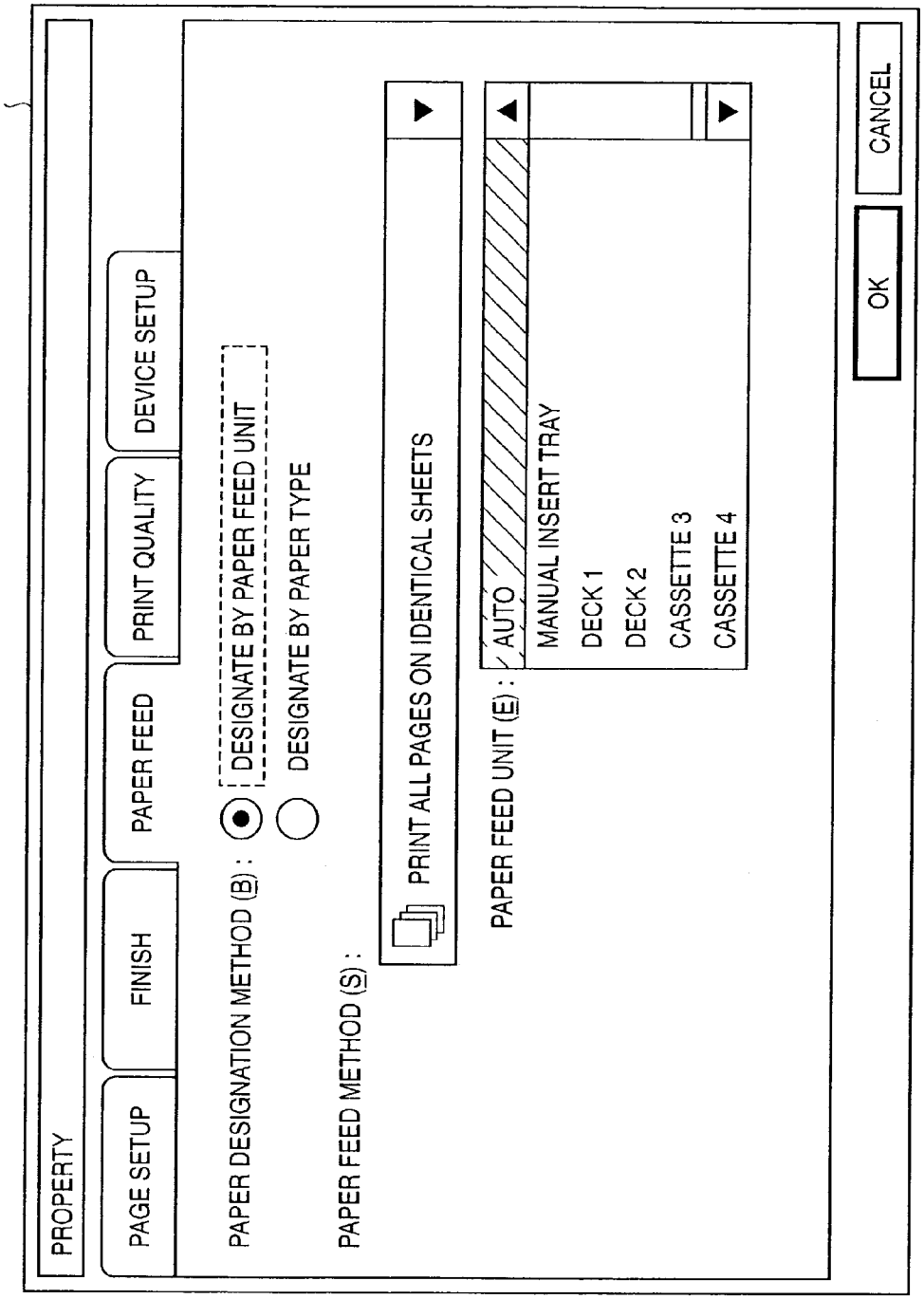
FIG. 9 shows an example of a user interface when firmware is old.

In step S506, the CPU 201 displays a dialog 901 used when it is determined that the "front/back cover insert" function is absent on the CRT 208, as shown in FIG. 9. On this dialog 901, the "front/back cover insert" function is masked on the user interface of the printer driver. In other words, the control 811 which allows the user to set the "front/back cover insert" function is not displayed, and the user cannot set the "front/back cover insert" function.

In this way, the user can be prevented from operating a function incompatible to the printer which installs old firmware, and any malfunctions of the printer can be avoided.

Note that steps S504 to S506 are processes in which the CPU 201 masks the control 811 on the dialog 801 to generate the dialog 901. Or these steps are processes in which the CPU 201 selects one of the dialogs 801 and 901.

The operation method and the operation of the printer driver when the printer driver has failed to automatically acquire printer information of the network printer 103 via the network will be explained in turn.

Assume that the printer driver attempts to acquire printer information of the network printer 103 in step S501, but fails to acquire in step S502. There are some reasons for such acquisition failure. For example, such failure occurs when a module for automatically acquiring printer information is not installed in the client computer 101 or 102 (the module for automatically acquiring printer information is installed when the user installs the printer driver using an installer of the printer driver, but it is not installed when the printer driver is installed from an "add printer" function as a function provided by the operating system), when the acquisition process of printer information is executed for a printer of a model that cannot return printer information, and so forth. In such case, the user must manually input the firmware ID and version information.

Figure 10:
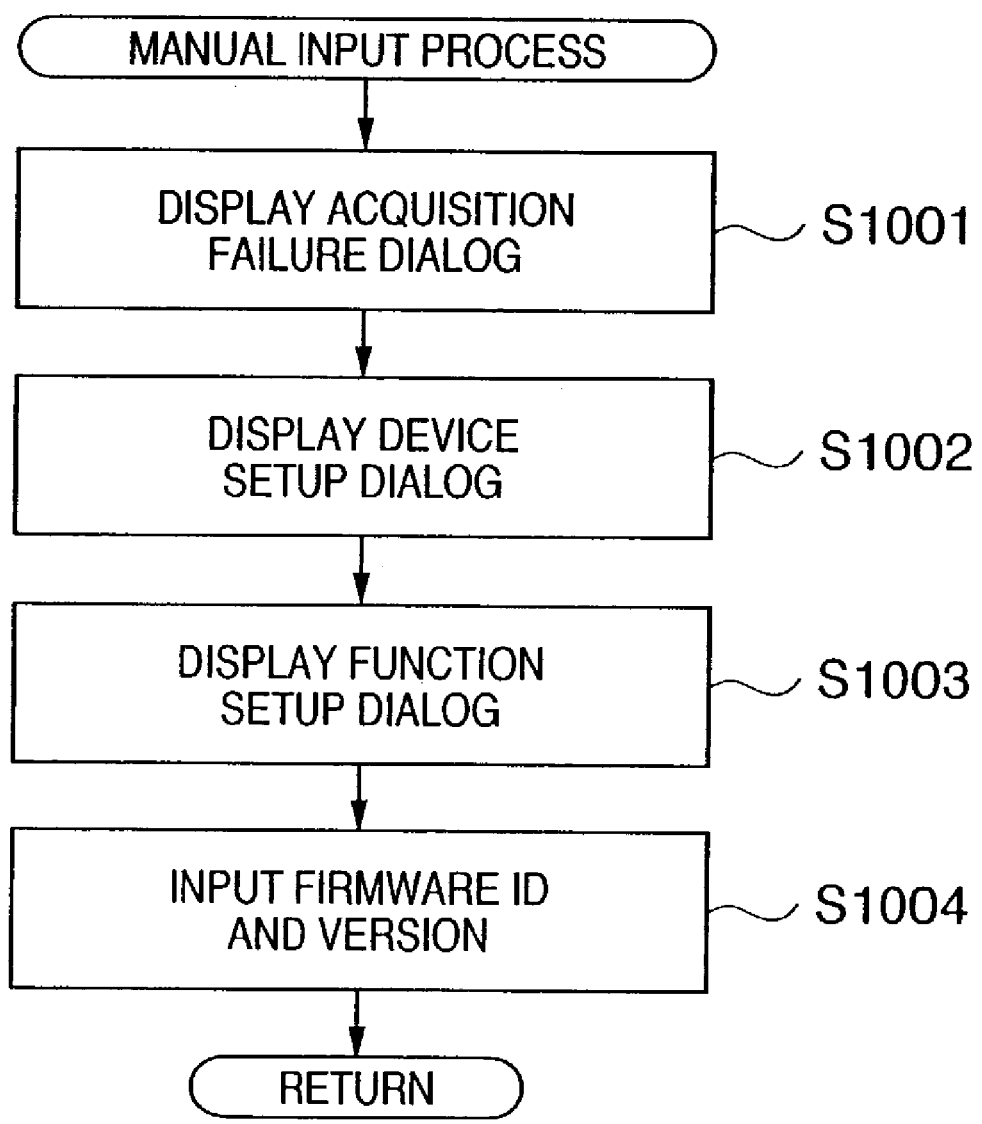
FIG. 10 is a flow chart showing a manual input process of firmware related information.

FIG. 10 is a flow chart showing a manual input process when the printer driver has failed to acquire firmware related information.

Figure 11:
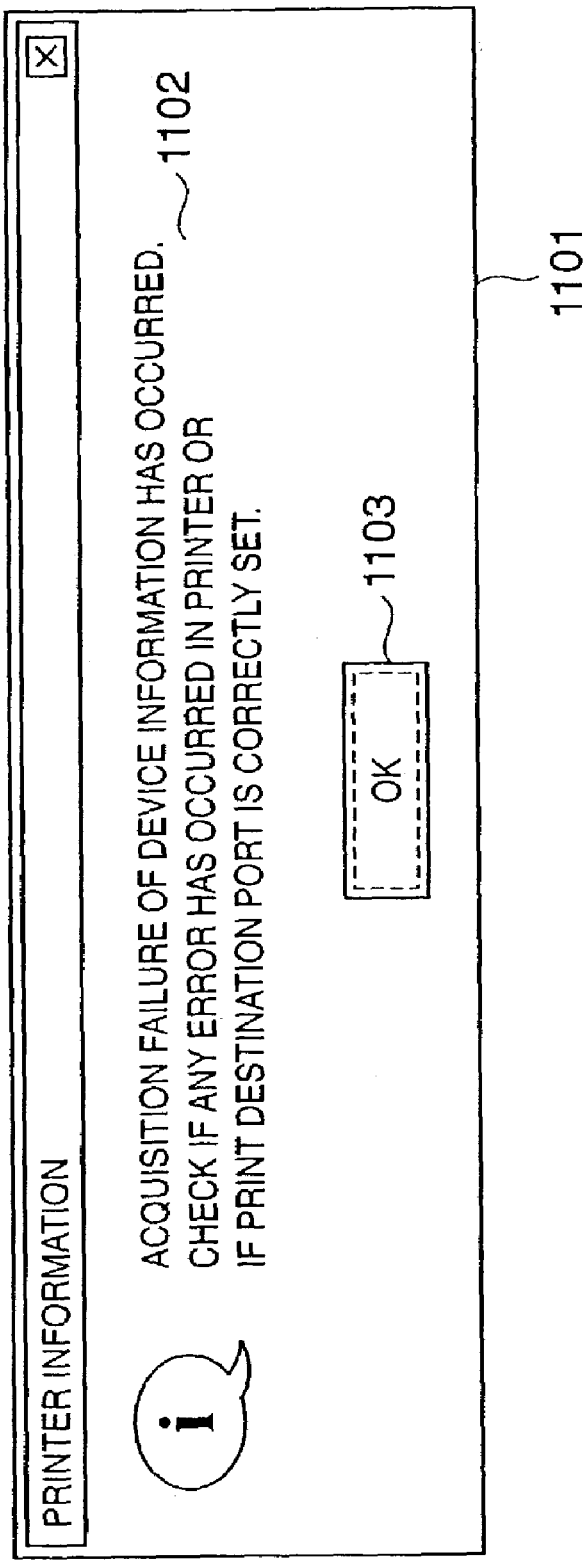
FIG. 11 shows an example of a dialog which informs the user of an automatic acquisition failure of firmware related information.

In step S1001, the CPU 201 displays a dialog 1101 shown in FIG. 11 to inform the user of the automatic acquisition failure of firmware related information. In this case, a message 1102 which informs that printer information cannot be automatically acquired is displayed. When the user presses an OK button 1103 on the message dialog 1101 using the keyboard/mouse 209, the dialog 1101 is closed, and the device setup sheet is activated again.

Figure 12:
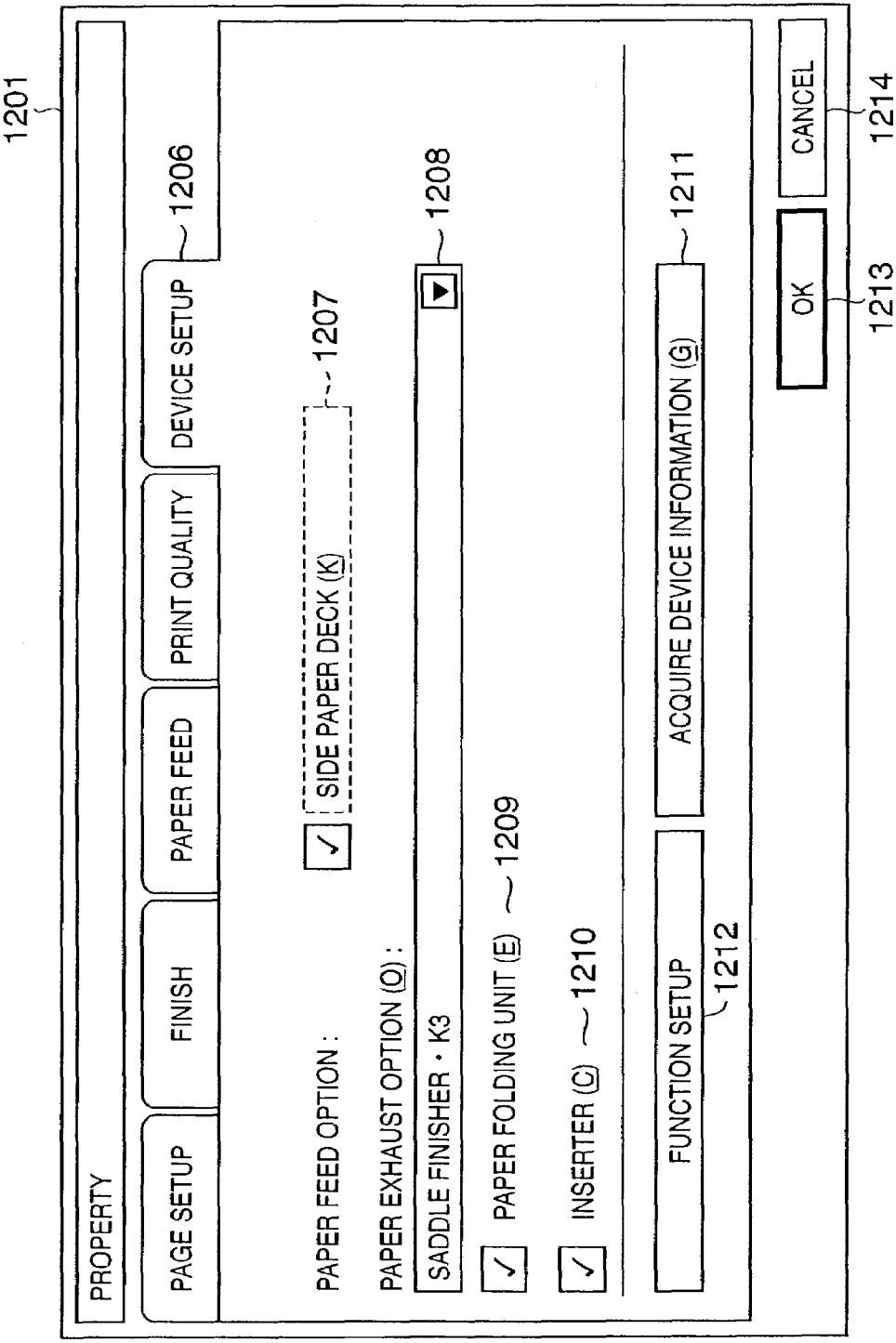
FIG. 12 shows an example of a device setup sheet.

In step S1002, the CPU 201 displays a dialog 1201 shown in FIG. 12 on the CRT 208. That is, since the printer driver has failed to acquire printer information, the user must set information such as the firmware ID, firmware version, and the like. For this purpose, the CPU 201 displays a function setup button 1212, as shown in a device setup sheet 1206 of the dialog 1201. The user manually sets device configuration information items 1207 to 1210 on this dialog 1201 with reference to an actual device.

In step S1003, the CPU 201 displays a function setup dialog on the CRT 208 upon detection of depression of the function setup button 1212.

Figure 13:
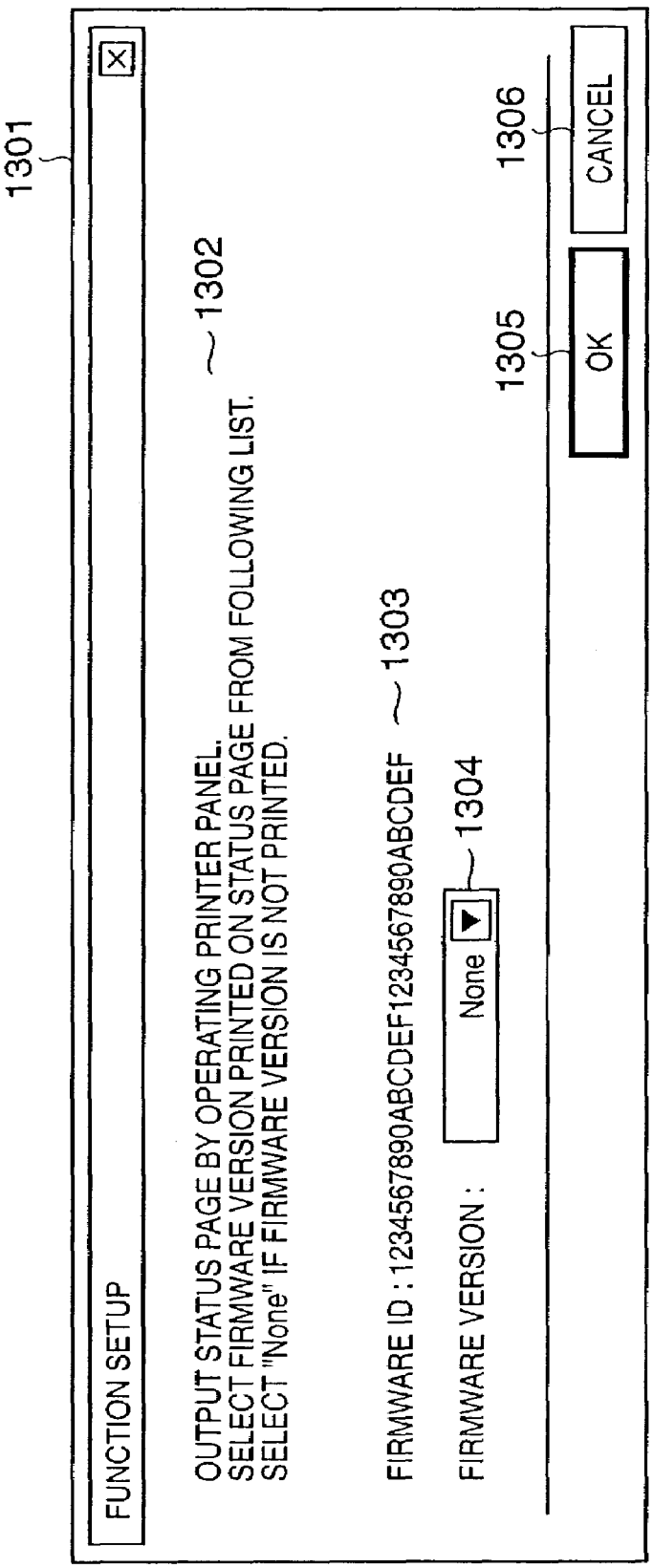
FIG. 13 shows an example of a function setup dialog.

FIG. 13 shows a function setup dialog 1301. The function setup dialog 1301 includes a message 1302 indicating a setup method, a firmware ID 1303, and a control 1304 used to set a firmware version. Note that reference numeral 1305 denotes an OK button used to enable setups; 1306, a cancel button used to cancel setups. Assume that the firmware ID is uniquely determined since the printer driver explained in this embodiment supports only the network printer to be described below. For this reason, a fixed value is displayed as the firmware ID on the function setup dialog. However, if one printer driver supports a plurality of types of printers, a control that can select a corresponding firmware ID may be displayed. Also, the firmware ID and version may be directly input from the keyboard 209.

The user outputs hardware information from the control panel of the network printer 103 in accordance with a message 1302 on the function setup dialog. More specifically, when the user instructs to print hardware information from the control panel (not shown), the CPU 216 of the network printer 103 accepts a print instruction, reads out the firmware ID and firmware version information, and other hardware information from the ROM 218, and sends a print instruction of hardware information to the controller 212.

FIG. 14 shows a print example of hardware information. A hardware information page 1401 shown in FIG. 14 is output. On this hardware information page 1401, a firmware ID 1402 and firmware version 1403 of this network printer are printed. When a status print process is made at the latest printer, since the firmware version 1403 is printed, the user selects a corresponding firmware version on the window of FIG. 13. When a status print process is made at an old printer, the field of the firmware version 1403 is not printed. In this case, the user selects "None" on the window of FIG. 13. In this manner, a conventional model which cannot print the firmware version can be coped with.

In place of printing the information, the CPU 216 may control a liquid crystal display or the like equipped on the network printer 103 to display hardware information, or may control an audio output device such as a loudspeaker or the like to audibly output hardware information.

Also, the user may instruct to output hardware information from the client computer 101. For example, the CPU 201 displays a hardware information print instruction button on the CRT 208. Upon detection of depression of that button by the mouse 209, the CPU 201 sends a hardware information output instruction to the network printer 103 via the communication interface 206. Upon reception of the output instruction via the communication interface 211, the CPU 216 of the network printer 213 controls the corresponding unit to output hardware information, as described above. In this case, the message 1302 may have contents that prompt the user to press the hardware information print instruction button.

In general, since the user can operate the mouse or the like of the computer more easily than the control panel of the printer, the user's operability may improve.

In step S1004, the user sets a firmware version 1304 of the network printer 103 on the function setup dialog 1301 of the printer driver on the basis of the printer information page. More specifically, the CPU 201 stores the firmware ID and firmware version input via the keyboard/mouse 209 in a storage device such as the HDD 207 or the like. For example, since "2.0" is printed as the firmware version 1403 on the hardware information page shown in FIG. 14, the user selects "2.0" from the firmware version control 1304 on the function setup dialog 1301. After that, the user presses the OK button 1305 to enable the setups. The flow then returns to step S503, and the CPU 201 provides a user interface corresponding to the firmware. In this way, even when firmware related information cannot be automatically acquired, the firmware version of the network printer is set to be 0x0200 on the basis of the information input by the user. Therefore, it is determined that the printer supports the "front/back cover insert" function. In this case, the printer driver displays the "front/back cover insert" function button on a paper feed sheet as a sheet used to set the "front/back cover insert" function (FIG. 8). On the other hand, when "version 1.0" or "None" is selected on the window of FIG. 13, the "front/back cover insert" function is disabled, and no "front/back cover insert" function button is displayed on the paper feed sheet (FIG. 9). In this manner, when "None" is selected, the function is disabled since a model is unknown or old. Thus, a mechanism that can appropriately cope with such old model can be provided.

In this fashion, a function added upon updating the firmware is appropriately reflected in the user interface of the printer driver by automatically acquiring printer information.

In the above embodiment, the presence/absence of a new function is specified on the basis of the firmware ID and firmware version, and the user interface is provided in accordance with the presence/absence of the new function. However, other kinds of information may be used as long as the presence/absence of the new function can be specified, as will be understood by those who are skilled in the art.

ANOTHER EMBODIMENT

The present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the flow charts shown in FIGS. 5 and 9 mentioned above.

As described above, the present invention can reduce adverse influences when a mismatch between the firmware version and driver version has occurred. For example, even in a printer to which a function can be added by updating firmware, the user can set up the printer driver and can print without recognizing a different function ahead of time.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
   an obtaining component which obtains firmware-associated information from a printer;
   a determination component which determines whether the firmware-associated information is obtained from the printer;
   a display component which displays input dialogue on which a user manually inputs the firmware-associated information, wherein said display component displays the input dialogue in case said determination component determines that said obtaining component could not obtain the firmware-associated information from the printer; and
   a control component which makes said display component provide a user interface on which the user sets a printer function according to the firmware-associated information obtained by said obtaining component or obtained through the input dialogue.

2. The apparatus according to claim 1, wherein the input dialogue includes a message indicating that the firmware-associated information can be obtained by outputting a status page from the printer.

3. The apparatus according to claim 1, wherein said display component is further adapted to display, prior to displaying the manual input dialogue, a message indicating that the firmware-associated information is not obtained in case the firmware-associated information could not be obtained.

4. The apparatus according to claim 1, wherein said display component is further adapted to display a message indicating that the firmware-associated information is not obtained in case the firmware-associated information could not be obtained, to display a device setup sheet having a function setup button, and to display a function-setting dialogue as input dialogue when the function setup button is pressed down.

5. The apparatus according to claim 1, wherein the firmware-associated information comprises a firmware TD and/or firmware version information.

6. The apparatus according to claim 1, wherein an old printer among the printers is adapted to print status information without firmware-associated information, and a new printer among the printers is adapted to print status information with firmware-associated information.

7. The program according to claim 1, wherein an old printer among the printers is adapted to print status information without firmware-associated information, and a new printer among the printers is adapted to print status information with the firmware-associated information.

8. A method of controlling a user interface in an image processing apparatus comprising the steps of:
   obtaining firmware-associated information from a printer;
   determining whether the firmware-associated information is obtained from the printer;
   displaying input dialogue on which a user manually inputs the firmware-associated information, wherein the input dialogue is displayed in case it is determined that the firmware-associated information from the printer could not been obtained; and
   providing a user interface on which the user sets a printer function according to the firmware-associated information obtained by said step of obtaining or obtained through the input dialogue.

9. The method according to claim 8, wherein the input dialogue includes a message indicating that the firmware-associated information can be obtained by outputting a status page from the printer.

10. The method according to claim 8, wherein said display component is further adapted to display, prior to displaying the manual input dialogue, a message indicating that the firmware-associated information is not obtained in case the firmware-associated information could not be obtained.

11. The method according to claim 8, wherein said display component is further adapted to display a message indicating that the firmware-associated information is not obtained in case the firmware-associated information could not be obtained, to display a device setup sheet having a function setup button, and to display a function-setting dialogue as the input dialogue when the function setup button is pressed down.

12. The method according to claim 8, wherein the firmware-associated information comprises a firmware ID and/or firmware version information.

13. The method according to claim 8, wherein an old printer among the printers is adapted to print status information without firmware-associated information, and a new printer among the printers is adapted to print status information with firmware-associated information.

14. A computer-readable storage medium storing a computer program causing a computer in an information processing apparatus to:
  obtain firmware-associated information from a printer;
  determine whether the firmware-associated information is obtained from the printer;
  display input dialogue on which a user manually inputs the firmware-associated information, wherein the input dialogue is displayed in case it is determined that the firmware-associated information of the printer could not been obtained; and
  provide a user interface on which the user sets a printer function according to the firmware-associated information obtained from the printer or obtained through the input dialogue.

15. The program according to claim 14, wherein the input dialogue includes a message indicating that the firmware-associated information can be obtained by outputting a status page from the printer.

16. The program according to claim 14, wherein said display component is further adapted to display, prior to displaying the manual input dialogue, a message indicating that the firmware-associated information is not obtained in case the firmware-associated information could not be obtained.

17. The program according to claim 14, wherein said display component is further adapted to display a message indicating that the firmware-associated information is not obtained in case the firmware-associated information could not be obtained, to display a device setup sheet having a function setup button, and to display a function-setting dialogue as input dialogue when the function setup button is pressed down.

18. The program according to claim 14, wherein the firmware-associated information comprises a firmware ID and/or firmware version information.

* * * * *

UNITED STATES PATENT AND TRADEMARK OFFICE
CERTIFICATE OF CORRECTION

PATENT NO. : 7,408,662 B2  Page 1 of 1
APPLICATION NO. : 10/350049
DATED : August 5, 2008
INVENTOR(S) : Masayuki Sakura It is certified that error appears in the above-identified patent and that said Letters Patent is hereby corrected as shown below:

<u>TITLE PAGE, ITEM (56)</u>:
    Foreign Patent Documents, "99/09470" should read -- WO 99/09470 --.

<u>COLUMN 10</u>:
    Line 24, "TD" should read -- ID --; and
    Line 45, "been" should read -- be --.

Signed and Sealed this

Twenty-seventh Day of January, 2009

JOHN DOLL
*Acting Director of the United States Patent and Trademark Office*